Sept. 5, 1961   J. H. MILLER   2,998,896
CONTAINER
Filed Jan. 13, 1958
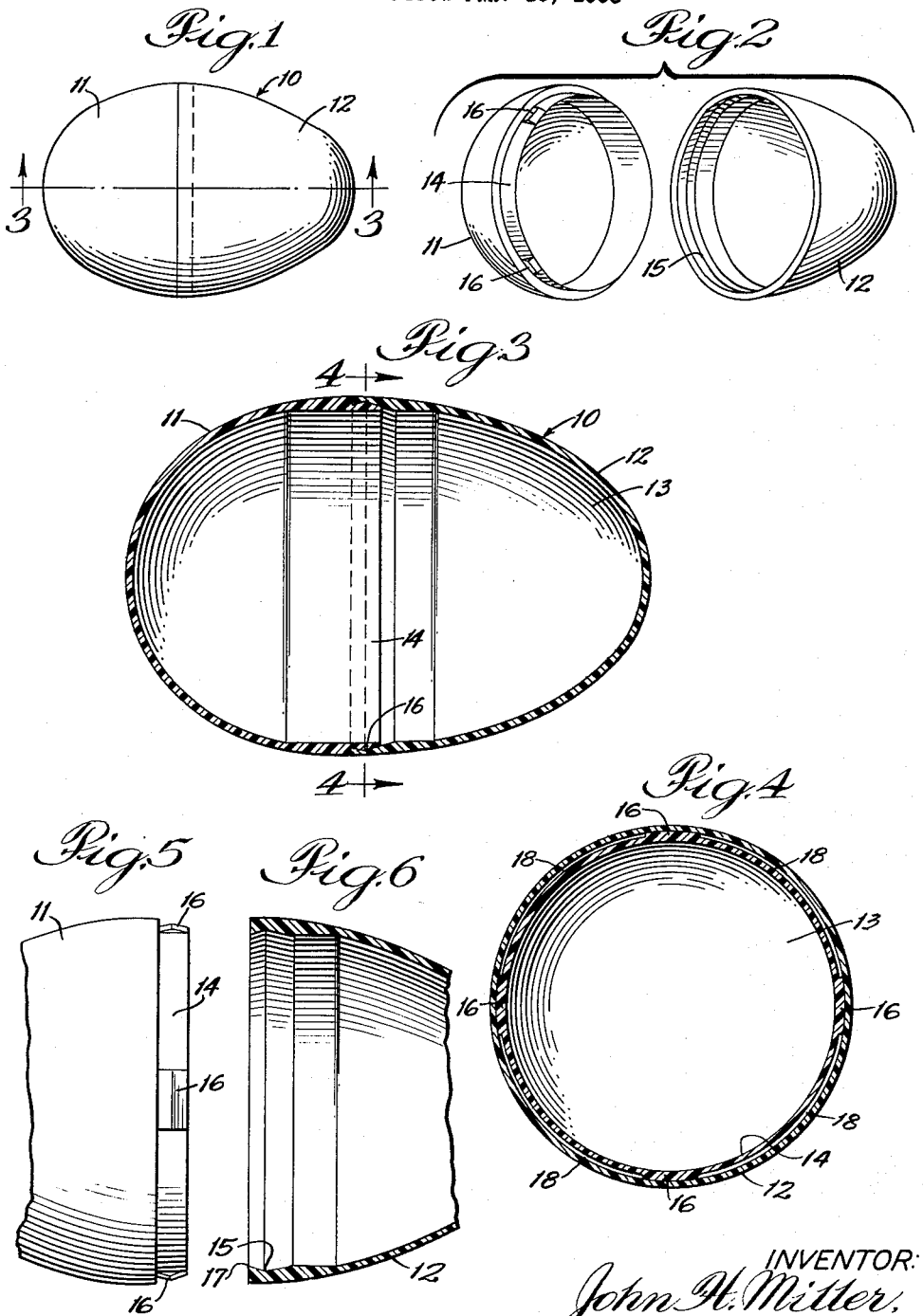
INVENTOR:
John H. Miller
BY Dawson, Tilton, Fallon & Lungmus
ATTORNEYS.

United States Patent Office 2,998,896
Patented Sept. 5, 1961

2,998,896
CONTAINER
John H. Miller, La Grange, Mo., assignor to Peoria Plastic Company, East Peoria, Ill., a corporation of Illinois
Filed Jan. 13, 1958, Ser. No. 708,544
1 Claim. (Cl. 220—4)

This invention relates to a container, and more specifically, to a hollow sectioned container molded from a flexible plastic material.

One of the principal objects of the present invention is to provide a container resembling an egg and composed of a pair of interlocking sections which may be easily molded from plastic materials. Another object is to provide simple but highly effective means for frictionally securing the complementary sections of a plastic container together. A further object is to utilize the natural flexibility of a suitable plastic material in providing a secure frictional interlock between complementary sections of a molded plastic container.

Other objects will appear from the specification and drawings in which:

FIGURE 1 is a side elevation of a container embodying the present invention.

FIGURE 2 is a perspective view of the complementary container sections in detached condition.

FIGURE 3 is an enlarged sectional view taken along line 3—3 of FIGURE 1.

FIGURE 4 is an enlarged transverse section taken along line 4—4 of FIGURE 3.

FIGURE 5 is an enlarged broken side elevation of one of the complementary container sections.

FIGURE 6 is an enlarged broken sectional view of the other container section of the complementary pair.

In the embodiment of the invention illustrated in the drawings the numeral 10 generally designates an egg-shaped container transversely divided into a pair of complementary sections 11 and 12. Each of the sections is separately molded from a strong flexible plastic material such as polystyrene, a synthetic resin formed by the polymerization of monomeric styrene

$$(C_6H_5CH:CH_2)$$

However, it will be understood that other suitable plastic materials having the desired properties of flexibility and strength may also be used.

As shown most clearly in FIGURES 3 and 4, the composite plastic shell or casing 10 is hollow and defines a cavity 13 therein. Therefore, when the sections of the transversely divided shell are separated as in FIGURE 2, each of them provides a circular opening for exposing the interior or cavity 13. Section 11 is provided with an integral sleeve 14 extending perimetrically or circumferentially about the opening of that section and having an outside diameter slightly smaller than the inside diameter of the complementary section 12 adjacent its respective opening. Thus, the two sections may be placed together in mating relation with the annular sleeve of section 11 projecting into the interior of section 12 and with the outer surfaces of both sections in flush relation.

From FIGURES 2 and 6 it will be seen that the inner surface of section 12 adjacent the opening thereof is provided with a circumferential V-shaped groove 15. Also, as shown in FIGURES 2 and 5, sleeve 14 of section 11 is equipped with a plurality of uniformly spaced lugs or projections 16 along its outer surface. These roof-shaped or V-shaped projections are adapted to seat snugly within the circumferential groove of the complementary container section 12 when the two sections are urged together.

Since the projections 16 are adapted to be snugly received within the V-shaped groove 15, it is apparent that the distance between the apexes of diametrically opposing projections is greater than the diameter of the opening defined by edge 17 of member 12. Since the sections of the container are formed from a relatively inelastic material, the two sections could not be interlocked by lugs 16 if it were not for the flexible nature of their walls and the difference in diameter between the outer surface of sleeve 14 and the inner surface of section 12. This relative difference in diameters is illustrated in FIGURE 4 by arcuate spaces 18. Thus, as the two sections of the container are urged together, the sloping walls of projections 16 engage edge 17 of section 12 and tend to spread apart those portions of the edge in contact with the projections. At the same time, the opposing forces exerted by section 12 tend to urge the spaced projections of the sleeve together. As a result, the portions of the sleeve 14 between the spaced projections tend to bow outwardly as the projections are displaced inwardly, and the portions of section 12 between the engaging projections tend to flex inwardly as other parts of edge 17 are displaced outwardly. This flexure of both the complementary sections is accommodated by the narrow spaces 18 between the sleeves and the lip of section 12.

When the arched projections 16 are fully seated within the V-shaped groove 15, the wall portions of both sections spring back into their original condition, as illustrated in FIGURE 4. Consequently, the complementary sections 11 and 12 are securely and frictionally interlocked. The spaced projections are therefore tightly held within the groove 15 by the flexible or spring-like walls of the container sections. In coupling or uncoupling these sections, the sloping surfaces of the projections 16 operate as cams to urge portions of edge 17 outwardly or radially.

An egg-shaped container embodying the present invention may be used to carry or store small articles of a variety of shapes and compositions, such as candy, trinkets, toys, etc. It is to be understood, of course, that the egg-shaped container illustrated and described above represents a preferred embodiment and that the invention is also applicable to containers of other shapes and sizes.

While in the foregoing specification the invention has been described in considerable detail for purposes of illustration, it will be understood by those skilled in the art that many of these details may be varied widely without departing from the spirit and scope of the invention.

I claim:

A hollow egg-shaped container being formed of a hard, flexible and substantially non-stretchable plastic material and being transversely divided into a pair of complementary sections having opposing circular openings, one of said sections having an inwardly-facing circumferential V-shaped groove along its inner surface adjacent the opening thereof, the other of said sections having an integral and flexible sleeve insertable into the opening of said first-mentioned section, said sleeve having a smaller external diameter than the internal diameter of said one section adjacent the opening thereof and having its outer surface spaced radially inwardly throughout the entire axial extent thereof from the internal surface of said one section when said sleeve is fully inserted therein, said sleeve being provided along its outer surface with a plurality of integrally-formed and circumferentially-spaced V-shaped projections having surfaces sloping towards and away from the sleeve's open end and being snugly received within the V-shaped groove of said one section for connecting said complementary sections together, said sleeve being provided between said projections with curved flexible portions adapted to flex outwardly into the space between the outer surface of said sleeve and the inner surface of said one section adjacent the opening thereof when said projections are urged inwardly during attachment and detachment of the sections.

References Cited in the file of this patent

UNITED STATES PATENTS

| | | |
|---|---|---|
| 476,309 | Record | June 7, 1892 |
| 1,063,609 | Shaw et al. | June 3, 1913 |
| 1,746,807 | Westerbeck | Feb. 11, 1930 |
| 1,943,327 | Langdon | Jan. 16, 1934 |
| 2,054,897 | Darling | Sept. 22, 1936 |
| 2,523,059 | Richert et al. | Sept. 19, 1950 |
| 2,533,159 | Yates | Dec. 5, 1950 |
| 2,720,332 | Holt | Oct. 11, 1953 |
| 2,706,065 | Stone | Apr. 12, 1955 |
| 2,745,642 | Hermann | May 15, 1956 |
| 2,790,576 | Lawrence | Apr. 30, 1957 |
| 2,875,762 | Middleton et al. | Mar. 3, 1959 |

FOREIGN PATENTS

| | | |
|---|---|---|
| 742,280 | France | Dec. 27, 1932 |
| 889,647 | Germany | Sept. 14, 1953 |